(12) United States Patent
Harris et al.

(10) Patent No.: US 8,191,012 B2
(45) Date of Patent: May 29, 2012

(54) METHOD AND SYSTEM FOR CREATING THEME, TOPIC, AND STORY-BASED COVER PAGES

(75) Inventors: Jonathan Harris, Brooklyn, NY (US); Thomas M Tercek, Hastings on Hudson, NY (US); Kenneth Alexander Ellis, Hoboken, NJ (US)

(73) Assignee: Daylife, Inc., New York, NY (US)

( * ) Notice: Subject to any disclaimer, the term of this patent is extended or adjusted under 35 U.S.C. 154(b) by 1034 days.

(21) Appl. No.: 12/027,700

(22) Filed: Feb. 7, 2008

(65) Prior Publication Data

US 2009/0064003 A1   Mar. 5, 2009

Related U.S. Application Data

(63) Continuation-in-part of application No. 11/848,134, filed on Aug. 30, 2007.

(51) Int. Cl.
*G06F 3/048* (2006.01)
*G06F 3/00* (2006.01)

(52) U.S. Cl. ........ 715/838; 715/810; 715/825; 715/835; 715/840; 715/855

(58) Field of Classification Search .................. 715/835, 715/837, 838, 840, 810, 818, 825, 853–855
See application file for complete search history.

(56) References Cited

U.S. PATENT DOCUMENTS

| | | | | |
|---|---|---|---|---|
| 6,112,201 | A * | 8/2000 | Wical | 1/1 |
| 6,185,531 | B1 * | 2/2001 | Schwartz et al. | 704/256.1 |
| 6,810,410 | B1 * | 10/2004 | Durham | 709/203 |
| 7,831,928 | B1 * | 11/2010 | Rose et al. | 715/810 |
| 2002/0016801 | A1 * | 2/2002 | Reiley et al. | 707/523 |
| 2002/0152245 | A1 * | 10/2002 | McCaskey et al. | 707/530 |
| 2003/0167449 | A1 * | 9/2003 | Warren et al. | 715/531 |
| 2005/0235198 | A1 * | 10/2005 | Howard et al. | 715/500.1 |
| 2007/0150368 | A1 * | 6/2007 | Arora et al. | 705/26 |
| 2007/0250511 | A1 * | 10/2007 | Endler et al. | 707/10 |
| 2008/0104048 | A1 * | 5/2008 | Surendran | 707/5 |
| 2008/0155422 | A1 * | 6/2008 | Manico et al. | 715/731 |

* cited by examiner

*Primary Examiner* — Nicholas Augustine
(74) *Attorney, Agent, or Firm* — Scott T. Weingaertner; Joseph D. Eng, Jr.; King & Spalding LLP (57) ABSTRACT

A method creates cover pages for news themes, topics, and stories, with elements to allow viewing more information from the theme, topic, or story. A database of stories is provided, comprising text, images, and possibly other web-accessible content. For a theme-based cover page, a theme is selected, and topics relevant to that theme are chosen. Search strings generated from the topics are used to search the database for matching stories. Representative images for the matching stories are then chosen from the database, and headlines are created based on the story content. For a topic-based cover page, a topic is selected and is used to search the database for matching stories. The cover page, comprising the image and information about the theme, topic, or story, is then created and displayed, with clickable elements to view more information about the theme, topic, or story.

2 Claims, 9 Drawing Sheets

METHOD AND SYSTEM FOR CREATING THEME, TOPIC, AND STORY-BASED COVER PAGES

This application is a continuation-in-part of pending U.S. patent application Ser. No. 11/848,134, filed Aug. 30, 2007, the entirety of which is hereby incorporated by reference.

BACKGROUND

Traditional print magazines have long used compelling cover images to attract readers and encourage them to explore the featured articles. Exploiting the capabilities of digital information processing and the Internet can provide powerful and succinct displays of information to increase viewership and to facilitate selecting stories of interest for further exploration. Online news sites such as http://abcnews.go.com, http://news.yahoo.com, and http://news.google.com aggregate and display stories from all over the world. The main pages on these and like websites typically display stories or articles according to general categories such as "World", "Business", "Technology", "Science", "Technology", "Entertainment", "Top Headlines", "Money", "Opinion", "Politics", "Travel", "Sports", "Most Popular", and the like. Creating and displaying a cover page related to a story, a topic, or a theme provides a much more engaging experience to users of the Internet. Thus, a need presently exists for a method and system for creating theme, topic, and story-based cover pages to induce viewers to explore news stories.

The main page for a news site typically encountered by an Internet user may list a selection of news stories identified by their headlines and allow selection of additional news stories from lists organized according to various categories. However, more viewers may be attracted by a large eyecatching image with an appropriate headline that links the viewer to more information. As they become more sophisticated and discriminating consumers of web content, users may find it interesting to view sets of stories having a particular theme, rather than stories belonging to a traditional category. For example, a user may be interested in viewing stories focusing on conflicts. The conflicts may comprise warfare in the Middle East, conflicts between the Vatican and other religious groups, conflicts between labor and management relating to strikes or protests, and other conflicts that are also unrelated by category. In this example, Middle East conflicts may fall in the general "World" category, and the labor/management conflicts may fall in the general "Business" category. Current news sites, however, generally do not provide thematic organization of news stories. They also do not select and display meaningful large images to identify stories, topics, or themes. Displaying a meaningful image with an appropriate headline or caption that encapsulates a theme, topic, or story, with links to allow viewing the substance of the story, fills the need of viewers for an appealing introduction to the information they are seeking.

A news story is frequently of interest to viewers not merely in and of itself, but also in the larger context. The context of a news story includes not only how the story is categorized, but also how it is presented by different news outlets, how it has developed over time, and how the story relates to people or institutions mentioned therein. Current news sites may present the story itself, but the viewer must then do his own further research to place the story in context. A service that presents a news story along with additional information about the story and about related entities is of clear value to Internet users.

SUMMARY

Stories from a database of stories are organized and displayed with an initial cover page containing information related to the story, topic, or theme providing the introduction to the story, topic, or theme.

For a story-based cover page, a lead story is selected from the database of stories. A representative image related to the lead story is selected, and a headline related to the story is created. Additional feature stories may be selected from the database of stories, in which case a representative image and headline are created for each feature story. A single web page is then created that displays the representative image and the headline for the lead story with associated information, and links that enable the viewer to view the lead story or to select a cover page for a different lead story from among the additional feature stories, if additional feature stories have been selected.

For a topic-based cover page, a plurality of topic names is chosen. For each topic name, a topic search string is created, and for each topic search string, the database is searched for stories matching the topic search string. For at least some of the matching stories, a representative image is selected and a headline is chosen. Then, a cover page displayed for the first matching story, comprising the representative image for the first matching story, the headline for the first matching story, and links to enable the viewer to view the first matching story or to select one of the additional matching stories.

For a theme-based cover page, a first theme name is created and a plurality of topic names is chosen for the first theme name. For each topic name, a topic search string is created, and for each topic search string, the database is search for stories matching the topic search string. Then, at least some of the matching stories are displayed as a single web page. In one embodiment, the matching stories are displayed according to topic names. In another embodiment, at least one more theme name is created. A plurality of topic names is chosen for the at least one more theme name, and for each topic name, a topic search string is created. Then, the database is searched for stories matching the topic search string and the matching stories are displayed as a single web page.

DETAILED DESCRIPTION OF THE PRESENTLY PREFERRED EMBODIMENTS

Figure 1:
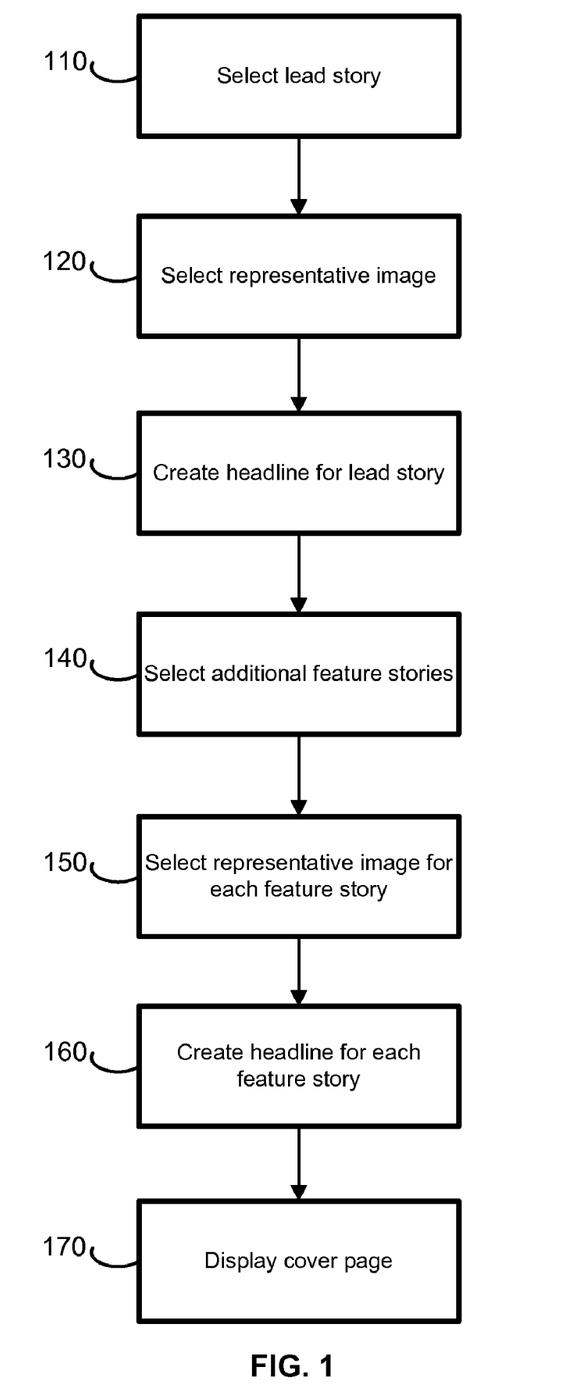
FIG. 1 is a method for creating and displaying a story based cover page.

FIG. 1 shows a method for creating and displaying a story based cover page. The method utilizes a database of existing news stories from various sources. A news story consists of one or more articles, each article comprising a headline, body text, and a source and time of publication of the article, and each article possibly including a byline, one or more images, either embedded or as links, and additional web-accessible content such as video or audio files, animations, or other executable, playable, or displayable files. Image files that comprise an article include source, date, and time of publication of the file. Images may include a caption and may also include a photographer's name. The sources from which the articles are drawn may include Agence France-Press (AFP), Reuters, Associated Press (AP), Los Angeles Times, New York Times, USA Today, National Public Radio (NPR), CNN.com, Slashdot.org, and thousands of other online local, regional, national, and international news outlets.

Currently existing news aggregator servers provide a way for Internet users to view articles from a multiplicity of sources. These servers do not create original content; they organize, select, restructure, and group articles from the sources that created them. They may also collect information relating to the content, such as how many times a given story or article is viewed. Methods currently exist for accessing, reading, parsing, and manipulating the web pages that comprise the news articles. As disclosed in application Ser. No. 11/848,134, the existing articles may thus be accessed and examined to create a database of stories, utilizing any of a variety of well known and widely practiced methods. Users of the Internet are familiar with the methods of selecting pages to view by clicking on links to the desired content, and navigating among pages that present related material.

From a database of news stories, a lead story is selected (step 110), a representative image associated with the lead story is selected (step 120), and a headline for the lead story is created (step 130). The lead story selection can be made by a variety of criteria well known in the art of information representation. The lead story might be selected, for example, based on usage patterns for a particular user of the site, or based on previous recent hits for the stories in the database, or based on the number, size, and source of articles that comprise the story. The representative image can be selected from the images that are included with the articles that comprise the lead story, or can be selected from a different source of available images. The headline for the lead story may be created by examining existing headlines for the articles that comprise the lead story, or by examining the caption included with the representative image.

After the lead story is identified, additional feature stories are selected (step 140). The additional feature stories may be selected based on criteria similar or identical to those used in selecting the lead story, where additional feature stories are those selected as timely and interesting, but less so than the lead story. A representative image is selected for each additional feature story (step 150) by a process similar or analogous to the process of selecting the representative image for the lead story. A headline is created for each feature story (step 160) by a process similar or analogous to the process of creating the headline for the lead story.

Figure 2:
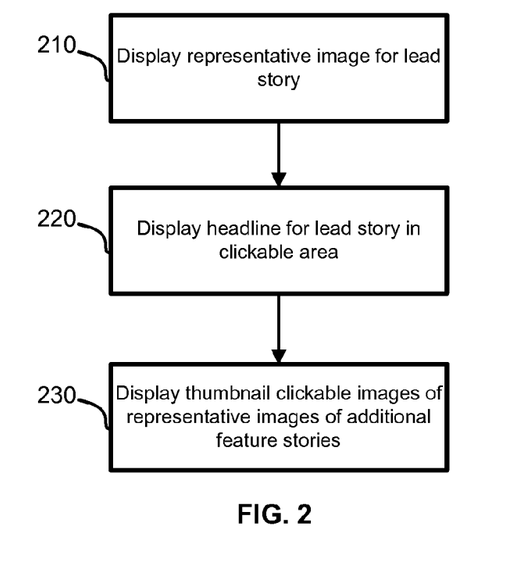
FIG. 2 shows steps of displaying a story based cover page.
Figure 4:
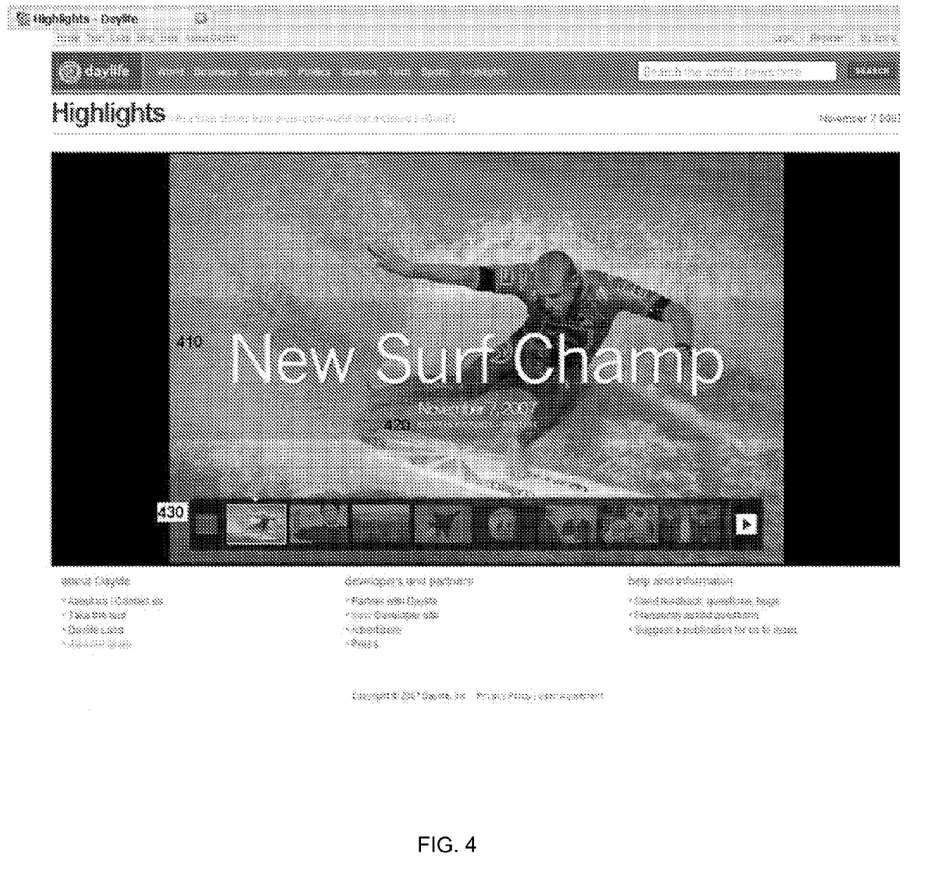
FIG. 4 is a sample story based cover page including clickable buttons for selecting a different lead story.

The story based cover page, a single web page comprising the image and information about the lead story and the additional feature stories, and links to allow further exploration of the selected stories, is then created according to the process shown in FIG. 2. The representative image for the lead story is displayed (step 210) as a large image, occupying substantially all of the web page. The headline for the lead story is displayed across the representative image (step 220) in an area that is linked to display the lead story upon user click. In one exemplary embodiment, the source of the representative image is also displayed on the lower part of the representative image (FIG. 4). Clickable thumbnail images of the representative images for each of the additional feature stories are also displayed across the lower part of the representative image for the lead story (step 230). Clicking any of the thumbnail images for each of the additional feature stories selects that additional feature story as the lead story and displays a cover page for the newly selected lead story. FIG. 4 shows one embodiment of a story based cover page. The headline is labeled as 410 in FIG. 4, and the source of the image as 420. The clickable thumbnails are arranged below the headline and labeled as 430.

Figure 3:
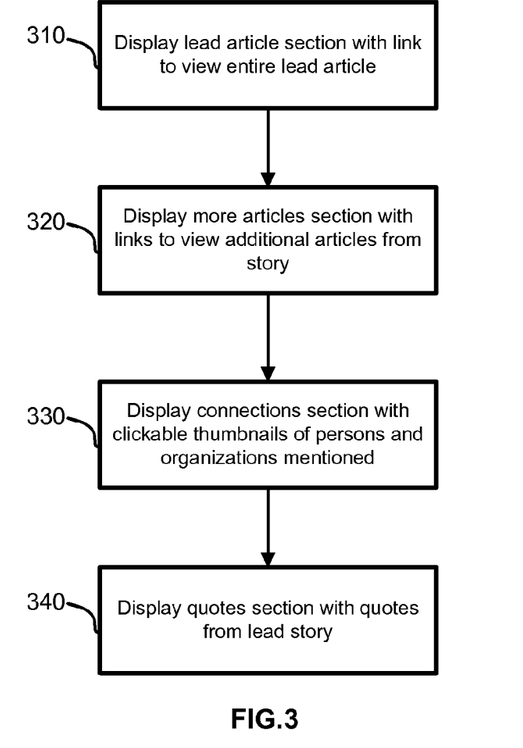
FIG. 3 shows additional steps of displaying a lead story page.
Figure 5:
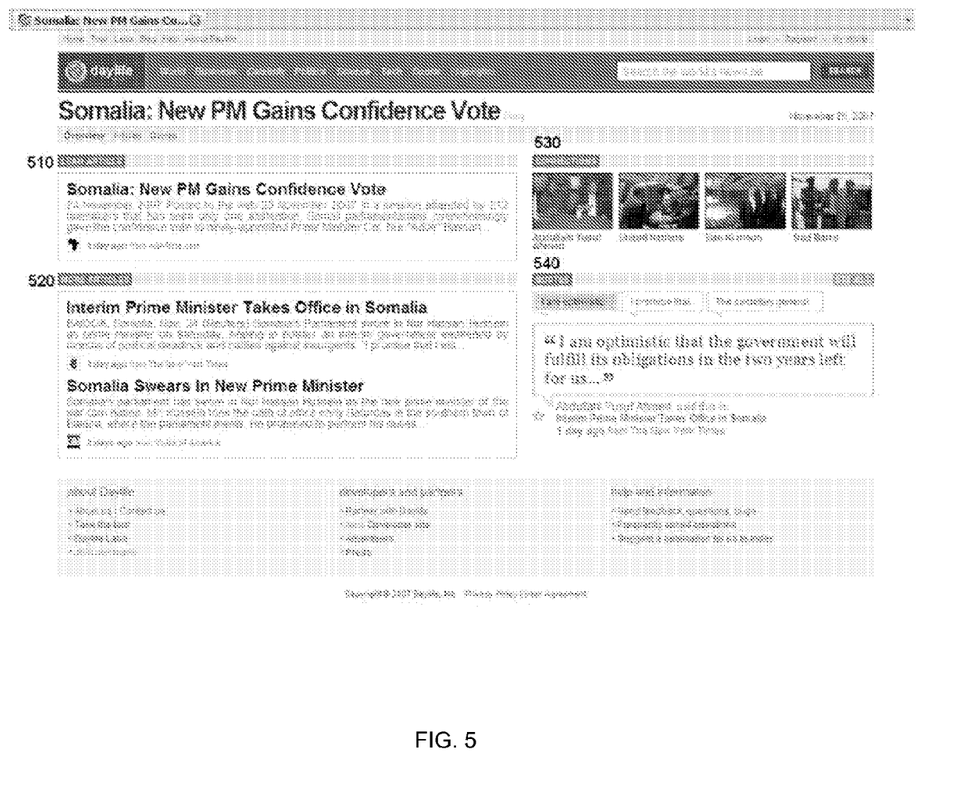
FIG. 5 is a sample story page.

Clicking on the lead story headline area on the story based cover page links to a display of the story page for the lead story. The steps shown in FIG. 3 disclose a method for displaying a story page, and FIG. 5 shows one embodiment of a story page. Displaying the story page comprises displaying a Lead Article section (step 310), in which the article headline, article source, time and date of article publication, and an initial text segment of the lead article are displayed, along with a link to allow viewing the entirety of the article. In the exemplary embodiment shown in FIG. 5, the Lead Article section is labeled as 510. Displaying the story page further comprises displaying a More Articles section (step 320), in which are displayed the article headlines, article sources, time and date of article publication, and initial text segments of each of a plurality of the additional articles that comprise the lead story, along with links to allow viewing the entirety of each of the additional articles. The More Articles section is labeled as 520 in FIG. 5. Displaying the story page also further comprises displaying a Connections section (step 330), which comprises clickable thumbnail images of persons and organizations mentioned in the story, each thumbnail image linking to a web page that displays information about that person or organization. The Connections section is labeled as 530 in FIG. 5. Existing search techniques allow searching the text of the articles of a lead story to identify persons and organizations. Existing search techniques also allow searching the Internet for other mentions of or references to the persons and organizations identified from the lead story. Displaying the story page further comprises displaying a Quotes section (step 340), which comprises displaying a selected quotation taken from one of the articles of the lead story, along with the headline of the article in which the statement was quoted and the time and source of publication of the article, and a link to display the entirety of the article from which the quotation was taken. The Quotes section is labeled as 540 in FIG. 5. Brief initial text segments of additional quotations are also displayed, each initial text segment being clickable to cause that additional quotation to become the selected quotation.

A cover page may also be created by basing the cover page on a topic or, even more generally, on a theme, rather than on an individual story. As described in application Ser. No. 11/848,134, incorporated herein by reference, any story can be characterized as having a theme or dominant idea. This theme is not the same as the category or classification to which a story may be assigned. Stories from many different categories may have the same theme. Some themes are perennial favorites for news stories. Examples of themes include Conflicts, Innovation, or Rogues. The theme of Conflicts might include stories relating to the Iraq War, to cyber attacks on websites, to U.S. presidential candidates' debates, to the Writers' Guild Strike, to a new Macintosh advertising campaign targeting the PC Vista operating system, and to Carl Icahn fighting for a seat on the Motorola board of directors. The theme of Innovation could include stories on new techniques for creating stem cells, on a significant improvement in laptop battery life, on the latest fashions on display in Milan, on an enhancement to Computer Generated Imagery demonstrated by a recent movie, and on a new dance craze sweeping the country. The theme of Rogues might include stories that mention or feature persons perceived as mischievous, outrageous, dishonest, or quirky or peculiar in some way. Stories about Rogues might include stories featuring Tom Cruise, Carl Icahn, Don Imus, or Rudolph Giuliani, but not Jim Lehrer, Mitt Romney or Al Gore. For each theme, then, a number of topics can be identified that match stories in many different categories.

Figure 6:
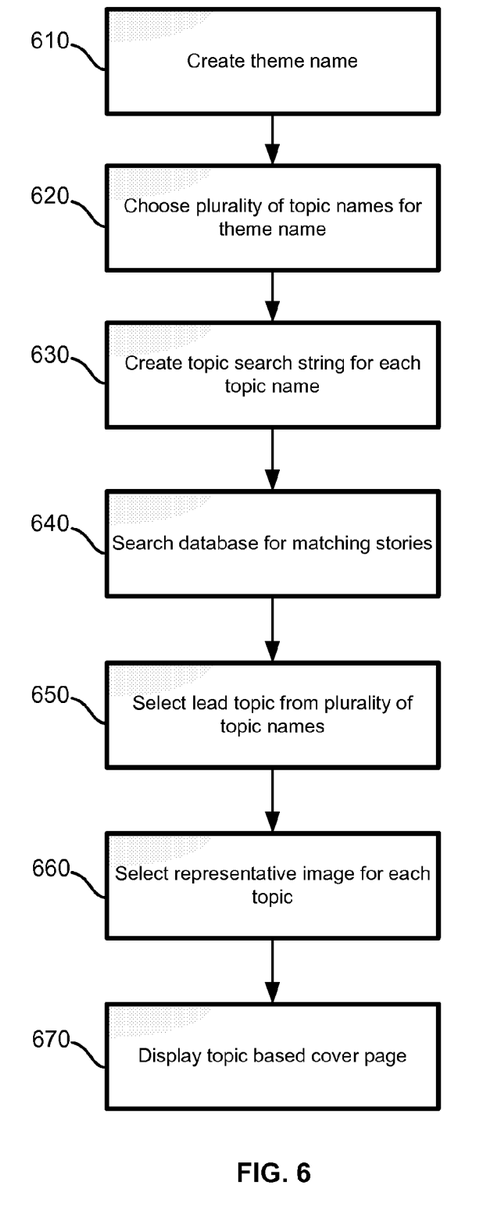
FIG. 6 is a method for creating and displaying a theme and topic based cover page.

As disclosed in application Ser. No. 11/848,134, a user may find it interesting to view a plurality of stories relating to a particular theme instead of stories selected according to a category or classification. FIG. 6 shows a method for creating and displaying cover pages organized by themes. A first theme name is created (step 610). For a given theme, there may be stories that belong to several different general topics. A plurality of topic names is then selected for the theme (step 620). The topic names represent different subjects within the theme. The topic names associated with a particular theme can change over time, based on current events. Topic names can include names of persons, organizations, concepts, events, or subjects. The following comprises exemplary topic names for some exemplary themes for one moment in time around October 2006:

| Theme Name | Topic Names |
| --- | --- |
| Conflicts | Fatah vs. Hamas, Iran's Nuclear Plans, The War in Iraq, Georgia vs. Russia, Pope Benedict vs. Islam, Hewlett Packard Spy Scandal, Nigerian Oil Dispute, Sudan Crisis |
| Innovation | Total Wireless Convergence Is Coming, Energy, Digital Privacy, Global Warming, New Planets Discovered, Breast Cancer Detection, Cell Phones |
| Rogues | Fugitive CEO Captured in Namibia, Tom Cruise, Andrew Fastow, Soldier Refuses Iraq Deployment, Kate Moss, Steve Jobs |

For each topic name, a search string is created (step 630) to allow searching the database of stories for stories that relate to the topic name. The search string may be a complex combination of terms and Boolean operators, along with wildcards or range specifiers of various sorts to allow for identification of appropriate stories. Creation of search strings with the proper syntax, and use of such strings to search databases are both procedures well understood by persons of ordinary skill in the art. The search string is then used to search the existing database of stories for stories that match the search criteria (step 640). The following comprises some exemplary topic search strings for some of the exemplary topic names for those exemplary themes for one moment in time around October 2006:

| Theme Name | Topic Name | Topic Search String |
| --- | --- | --- |
| Conflicts | Pope Benedict vs Islam | search?q=%22pope+benedict%22++OR+%22rosa+sgorbati%22+OR+Islam |
| | Hewlett Packard Spy Scandal | search?q=%22Mark+Hurd%22+OR+%22Patricia+C.+Dunn%22+or+%22carly+fiorina%22 |
| Innovation | Energy | search?q=%22power+supply+standard%22+OR+%22Ecos+Consulting%22+OR+%22Honda+Diesel+Engine%22+OR+%22diesel+powertrain+%22+OR+%22Energy+Information+Administration%22 |
| | Global Warming | search?q=%27%22Goddard+Institute+for+Space+Studies%22++OR++%22James+Hansen%22+OR+%22Global+Warming%22 |
| Rogues | Tom Cruise | search?q=%22tom+cruise%22+crazy |
| | Soldier Refuses Iraq Deployment | search?q=%28%22Fort+Lewis%22+soldier+refuse+deploy%29+OR+%22Fort+Lewis%22 |

When the matching stories have been identified, one topic is selected as the lead topic (step 650). The lead topic may be selected based on various criteria, such as usage patterns, number of matching stories, sources of matching stories, or other information seen as useful for identifying topics of high interest to the user or the user community. For each topic, a representative image is selected (step 660) from the images associated with stories that match that topic. Then a topic based cover page is displayed (step 670).

Figure 7:
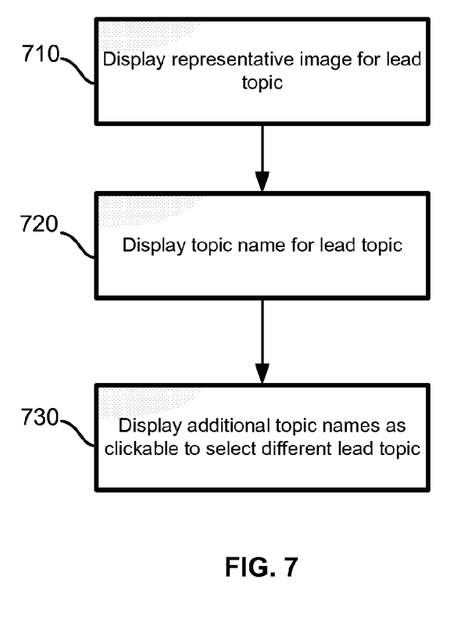
FIG. 7 shows steps of displaying a theme based cover page.
Figure 9:
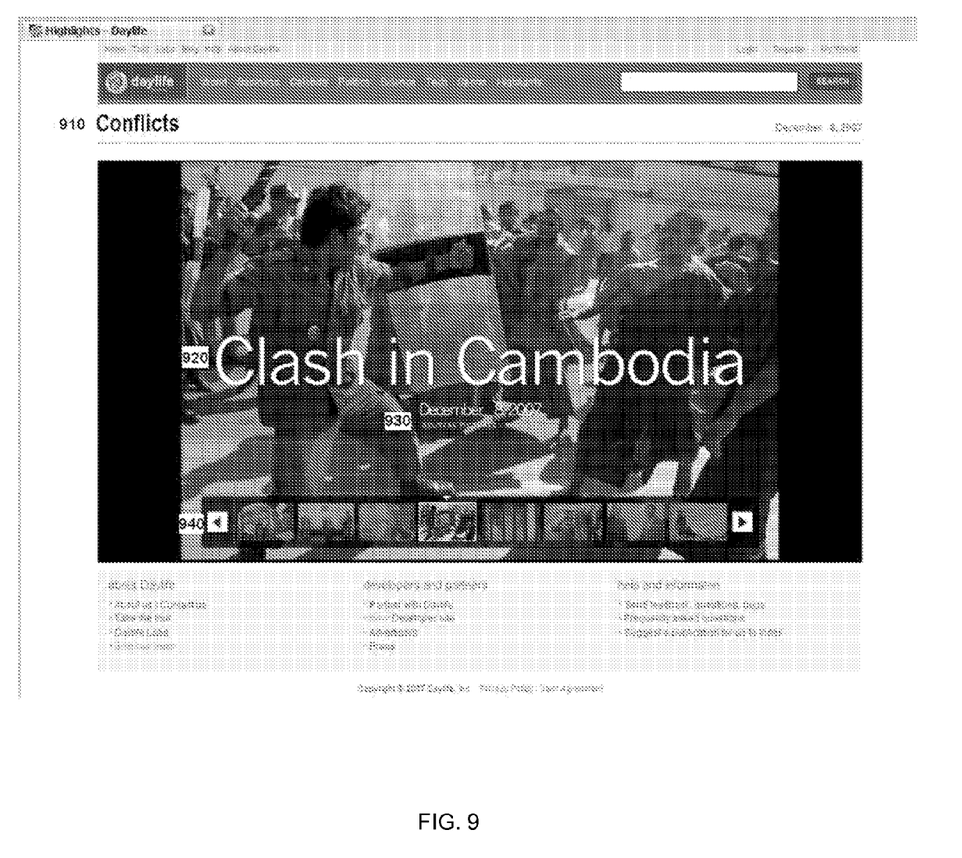
FIG. 9 is an example of a topic based coverpage with additional topics selectable as the lead topic.

FIG. 7 discloses a method for creating a topic based cover page, a single web page comprising the image and information about the lead topic and the additional topics, and links to allow further exploration of the selected topics. The representative image for the lead topic is displayed (step 710) as a large image, occupying substantially all of the web page. The topic name for the lead topic is displayed across the representative image (step 720) in an area that is linked to display the topic page for the lead topic upon user click. In one exemplary embodiment, the source of the representative image is also displayed on the lower part of the representative image. Topic names of each of the additional topics are also displayed across the lower part of the representative image for the lead topic (step 730), with links to allow selection of each additional topic as the lead topic. Clicking to select an additional topic as the lead topic displays a cover page for the newly selected lead topic. In one exemplary embodiment of the topic based cover page, thumbnail images of the representative images of each additional topic are displayed, with each additional topic name appearing on mouseover of the corresponding thumbnail image. FIG. 9 shows an exemplary embodiment of a cover page for the theme Conflicts. The theme name is shown at 910. The topic name of the lead topic is Clash in Cambodia (920), and the source of the representative image is seen at 930. Additional topics (940) related to the Conflicts theme are displayed as thumbnail images across the bottom of the image.

Figure 10A:
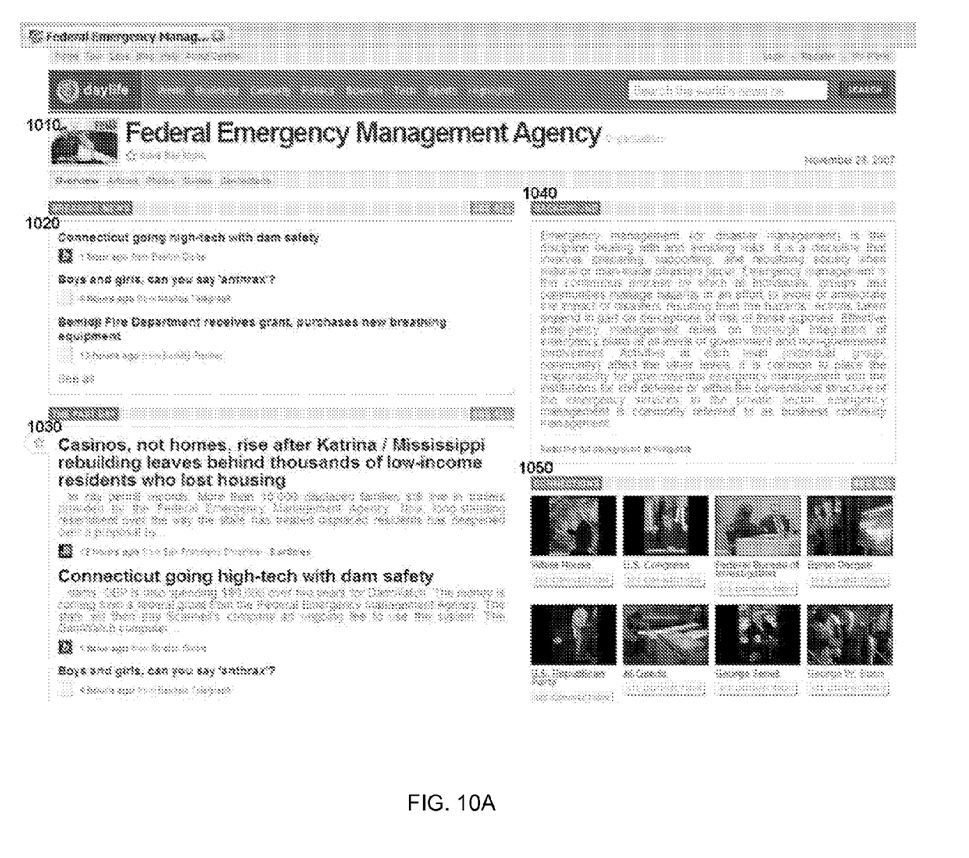
FIGS. 10A and 10B shows a sample topic page with the matching stories displayed.
Figure 10B:
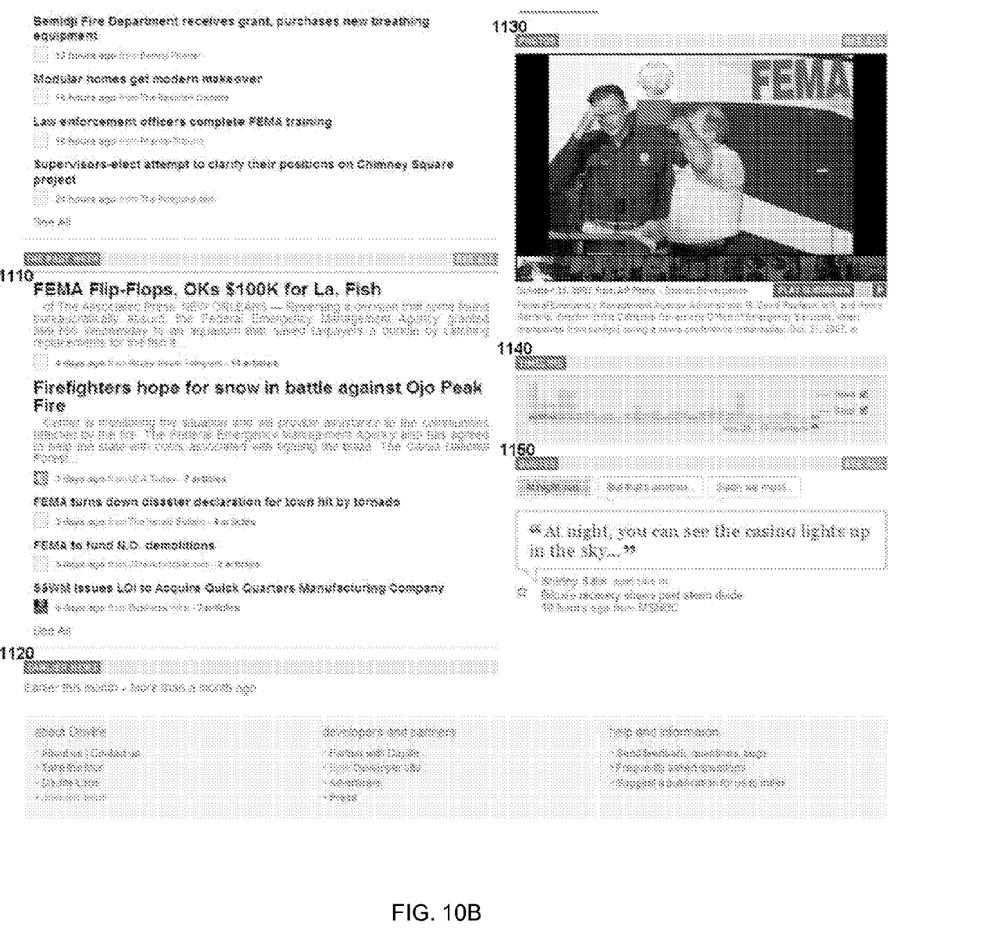

Clicking the topic name of the lead topic on the topic based cover page links to a display of the topic page for the lead topic. The method of displaying the topic page for the lead topic is disclosed in FIG. 8. The topic page is a single web page comprising information about the stories that match the selected topic. Displaying the topic page comprises displaying the topic name (step 810) as a title for the topic page. Displaying the topic page further comprises displaying information about a plurality of articles that match the topic search string, grouped according to their timeliness (step 820). In one exemplary embodiment of a topic page, for each of the plurality of articles in a time group, the article headlines, article sources, and the age of article publication are displayed, along with links to allow viewing the entirety of each of the articles. For each time grouping, a link to allow viewing all of the articles in that time group is also displayed. FIG. 10 shows an exemplary embodiment of a topic page for the topic named Federal Emergency Management Agency (1010).

FIGS. 10A and 10B represent a single scrollable web page in which the articles are grouped as Breaking News (1020), for articles published the day the topic is displayed; The Past Day (1030), for stories published the previous day; The Past Week (1110), for stories published within the past seven days; and Earlier News (1120), for stories more than seven days old. In the example shown, three articles are displayed under Breaking News, and seven stories under The Past Day. However, a greater or smaller number of articles or stories could be displayed in each timeliness grouping. The number of articles or stories displayed in each grouping and the amount of information about an article or story can be adjusted based on the total number of matching articles identified, or on other criteria, such as the number of times an article has been viewed in the recent past.

Figure 8:
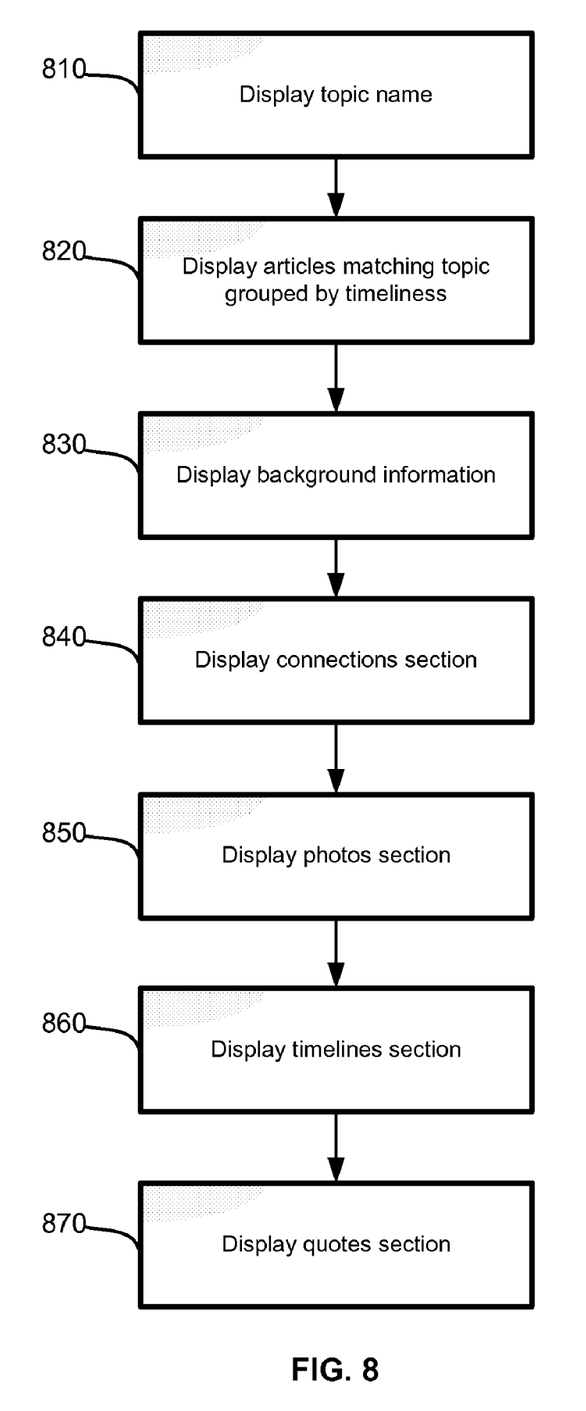
FIG. 8 shows additional steps of displaying a topic page.

In addition to the articles that match the topic, displaying the topic page further comprises displaying a Background section (step 830), which comprises an initial text selection from an online encyclopedia article or entry on the topic, along with a link to allow viewing the remainder of the online reference source article. Online encyclopedias are websites such as Wikipedia, Encarta, or Encyclopedia Britannica Online that display comprehensive articles on a variety of topics. An exemplary Background section for the Federal Emergency Management Agency topic is shown in FIG. 10, at 1040. The Background section displays an initial text selection from an encyclopedia entry on Emergency Management.

Displaying the topic page further comprises displaying a Connections section (step 840), which comprises clickable thumbnail images of a plurality of persons and organizations mentioned in the articles that match the topic, each thumbnail image linking to a topic page for that person or organization. Existing search techniques allow searching the text of the stories of a topic to identify persons and organizations. Existing search techniques also allow searching the Internet for other mentions of or references to the persons and organizations identified from the stories that match the topic. An exemplary Connections section is shown in FIG. 10A, at 1050. The Connections section allows the viewer to easily access pertinent information about persons or organizations mentioned in the articles that comprise the topic.

Displaying the topic page further comprises displaying a Photos section (step 850), which comprises displaying a first representative image for the topic, along with its source and date of publication, the name of the photographer, and the caption of the image, plus additional clickable thumbnail images of representative images from matching articles, and a control to allow viewing other representative images for the topic as a slide show. An exemplary Photos section for the Federal Emergency Management Agency topic is shown in FIG. 10B, at 1130.

Displaying the topic page further comprises displaying a Timeline section (step 860), which comprises displaying a graph of the number of mentions of the topic in news articles or in blogs for each day over the previous month. The timeline graph gives an indication to the viewer of how much news coverage the topic has received over the past month, as well as how many blog mentions the topic has gotten. An exemplary Timeline for the Federal Emergency Management Agency topic is shown in FIG. 10B, at 1140.

Displaying the topic page further comprises displaying a Quotes section (step 870), which comprises displaying at least part of the text of one statement quoted in one of the articles matching the topic search string, along with the headline of the article in which the statement was quoted and the time and source of publication of the article, and a link to display the entirety of the article from which the quotation was taken. An exemplary Quotes section for the Federal Emergency Management Agency topic is shown in FIG. 10B, at 1150.

The foregoing detailed description has discussed only a few of the many forms that this invention can take. It is intended that the foregoing detailed description be understood as an illustration of selected forms that the invention can take and not as a definition of the invention. It is only the following claims, including all equivalents, that are intended to define the scope of this invention.

What is claimed is:

1. A method for creating cover pages with features to enable selection of stories for further exploration, the method comprising the steps of:
    selecting a lead story from a database of stories, each story having a creation date;
    selecting a representative image for the lead story;
    identifying the source of the representative image for the lead story;
    creating a headline for the lead story;
    selecting a plurality of additional feature stories from the database of stories;
    selecting a representative image for each of the additional feature stories;
    creatin a headline for each of the additional feature stories; and
    displaying a cover page as a single web page, said cover page displaying comprising:
        displaying the representative image for the lead story at a size such that the representative image for the lead story covers substantially all of the single web page;
        displaying the headline for the lead story, the creation date of the lead story, and the source of the representative image for the lead story in a clickable area substantially near the vertical center of the representative image for the lead story, the clickable area extending horizontally across the entire representative image for the lead story and vertically over at least twenty percent of the representative image, wherein the headline for the lead story has a font size such that the headline for the lead story extends vertically over at least ten percent of the representative image, the clickable area linking to another page to view the lead story; and
        displaying a subset of the representative images for the plurality of additional feature stories as a set of thumbnail images substantially near the bottom of the representative image for the lead story, each of the thumbnail images being a clickable button to select the corresponding additional feature story as the lead story, and the set of thumbnail images being preceded and followed by navigation buttons to enable the display of the thumbnail for the previous or next additional feature story not currently being displayed,
        displaying a story page for the lead story when the lead story is selected by clicking on the clickable area extending across the representative image on the cover page, the story page comprising:
            a section wherein is displayed the lead article of the lead story, represented by the headline for the lead article of the lead story, a brief initial text segment from the lead article, and the source and time of publication of the lead article, plus a link to allow viewing the entirety of the lead article;
            if the lead story comprises more than a single article, displaying in a section each of a plurality of other articles comprising the lead story, represented by the headline for each of the plurality of other articles for the lead story, a brief initial text segment from each of the plurality of other articles for the lead story, and the source and time of publication of each of the plurality of other articles for the lead story, a link to allow viewing the entirety of each of the plurality of other articles for the lead story;

displaying in a section thumbnails representing at least some of the persons and organizations mentioned in any of the articles comprising the lead story, with identification of each thumbnail, each thumbnail linking to a topic page for the person or organization represented and identified; and displaying in a section the text of one or more statements quoted in one of the articles for the lead story, along with the headline of the article from which the quote was selected, the source of the article, and the time or publication of the article, and a link to allow viewing the entire article.

2. A method for creating theme and topic based cover pages with features to enable selection of stories for further exploration, the method comprising the steps of:

creating a first theme name;

choosing a plurality of topic names for the first theme name;

for each topic name, creating a topic search string;

for each topic search string, searching a database of stories for stories that match the search string;

selecting one topic name as the lead topic;

selecting a representative image for the lead topic;

identifying the source of the representative image for the lead topic;

selecting a representative image for each of the additional topics; and displaying a cover page as a single web page, said cover page displaying comprising:

displaying the representative image for the lead topic at a size such that the representative image for the lead topic covers substantially all of the single web page;

displaying the topic name of the lead topic in a clickable area substantially near the vertical center of the representative image for the lead topic, said clickable area extending horizontally across the entire representative image for the lead topic and vertically over at least twenty percent of the representative image, the topic name having a font size such that the topic name extends vertically over at least ten percent of the representative image, said clickable area linking to another web page that displays at least some of the stories matching the topic search string for the lead topic;

displaying the source of the representative image for the lead topic and the date of creation of the lead topic;

displaying the theme name; and displaying buttons that enable the viewer to select a different one of the additional topic names as the lead topic to be displayed;

displaying a topic page for the lead topic when the lead topic is selected for display by clicking on the clickable area extending substantially across the representative image on the page, the topic page comprising:

the topic name of the lead topic;

a plurality of matching articles for the lead topic, grouped by the timeliness of the articles' publication, each of the plurality of matching articles comprising:

the headline for the matching article;

the source and the age of publication of the matching article; and a link to allow viewing the entirety of the matching article;

additional links to allow viewing other matching articles for the lead topic not included in the plurality of matching articles displayed;

displaying in a section at least part of an entry about the topic from an online encyclopedia site;

displaying in a section thumbnails representing at least some of the persons and organizations mentioned in any of the matching articles, with identification of each thumbnail, each thumbnail linking to a topic page for the person or organization represented and identified;

displaying in a section a first representative image for the topic, plus additional clickable thumbnail images of representative images from matching articles, and a control to allow viewing other representative images for the topic as a slide show;

displaying in a section a graphic representation of the number of mentions of the topic search string in News and Blogs for each day of the past month; and displaying in a section at least part of the text of at least one statement quoted in one of the matching articles as a featured quote, along with the identity of the person making the statement, the headline of the article in which the statement is quoted, and the time of publication and source of the article, the headline of the article linking to the entirety of the article in which the statement is quoted, and additional clickable elements to allow selecting a different statement quoted in one of the matching articles as the featured quote, if more than one statement is quoted in the matching articles.

* * * * *